Figure 6:
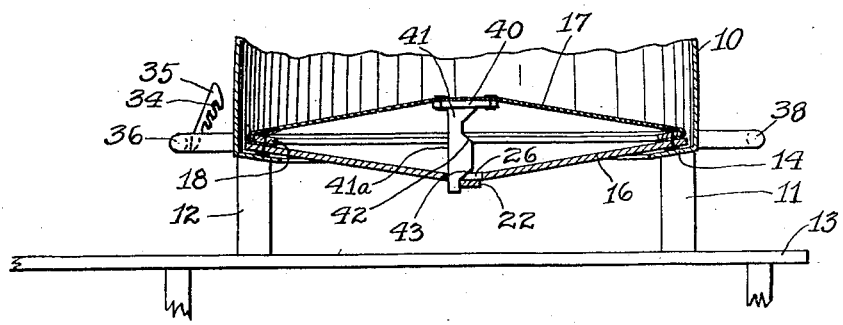

March 17, 1931. A. W. HERRIMAN 1,796,948
FRUIT PACKING DEVICE
Filed Oct. 22, 1928 2 Sheets-Sheet 1
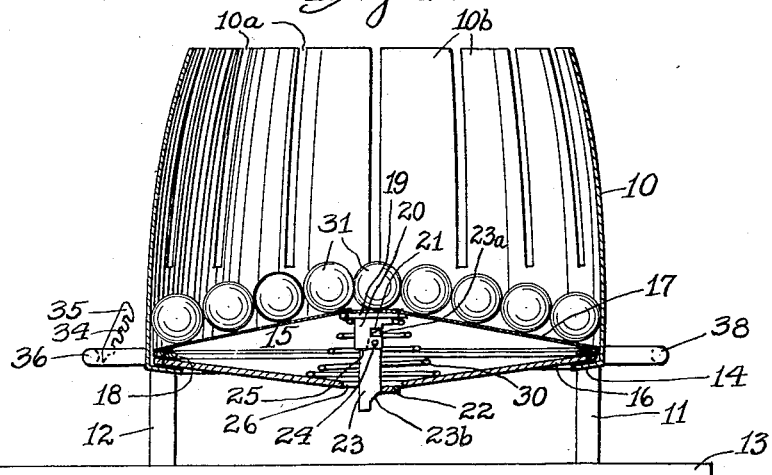
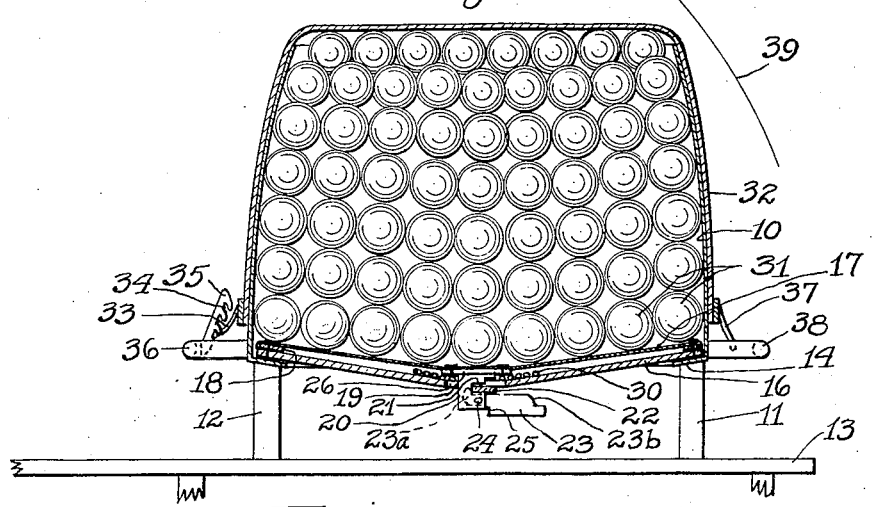
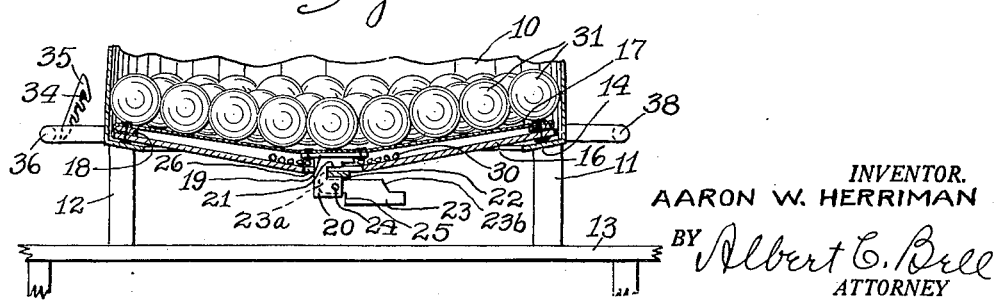
INVENTOR.
AARON W. HERRIMAN
BY Albert E. Bell
ATTORNEY March 17, 1931. A. W. HERRIMAN 1,796,948
FRUIT PACKING DEVICE
Filed Oct. 22, 1928   2 Sheets-Sheet 2

INVENTOR.
AARON W. HERRIMAN
BY Albert E. Bell
ATTORNEY

Patented Mar. 17, 1931

1,796,948

UNITED STATES PATENT OFFICE

AARON W. HERRIMAN, OF SOUTH HAVEN, MICHIGAN

FRUIT-PACKING DEVICE

Application filed October 22, 1928. Serial No. 314,020.

My invention relates to an improved construction of fruit packing device to facilitate packing fruit of different kinds in baskets and the like.

In the past it has been proposed to pack fruit in baskets by the aid of a form having the general size and shape of the interior of the basket to be packed, which form has an open bottom and which when used to pack the fruit, is placed on suitable supports, in reversed position, that is, with its top end lowermost. In this position, a separate bottom of one construction or another is inserted in the form, the top layer of the fruit is placed on the bottom of the form and placed in position to form the facing layer of the basket, after which the fruit is poured into the form to fill it, the basket to be packed is slipped on the form, the form and basket are reversed, the form is withdrawn from the basket leaving the bottom of the form on top of the fruit to hold it in place, and then the bottom of the form is removed from the packed basket, and the packing of the basket is complete.

My invention relates particularly to an improved construction of bottom for forms of the kind described above, and improved means for securing one of the handles of the basket being packed, to the form to facilitate reversing the basket and form after the fruit is in the form, by grasping only one side of the basket and form during the reversing operation, preparatory to removing the form from the basket.

My improved form bottom is constructed so that during the placing of the first or facing layer of the fruit in the form, the surface supporting the fruit is a surface generally conical in form, extending upwardly into the form in its reversed condition. When the facing layer has been arranged to the satisfaction of the packer, the conical facing layer of fruit is pressed downwardly by the packer, until it is in substantially horizontal position corresponding with the top layer of the fruit in the packed basket after the packing operation has been completed. My construction facilitates this pressing operation and provides that the fruit supporting surface may then be in substantially horizontal position. By my construction I provide in the form bottom, devices tending to hold the fruit supporting surface in conical position in the packing form, with greater or less stability as desired, and latching mechanism for holding the fruit receiving surface of the form bottom in either of its positions and permitting the fruit receiving surface to be moved quickly from one of its positions to the other. As a result of the facing layer of fruit being placed on the fruit receiving surface of the form bottom when it is in conical form, it will be observed that pressing it down to substantially horizontal position, compresses the fruit of the facing layer somewhat so that a firm pack will result and that there will be no danger of the fruit jarring around in the basket and becoming bruised during shipment.

Figure 7:
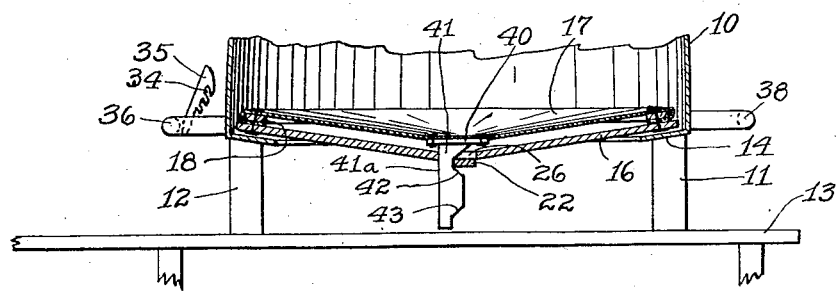
Figure 4:
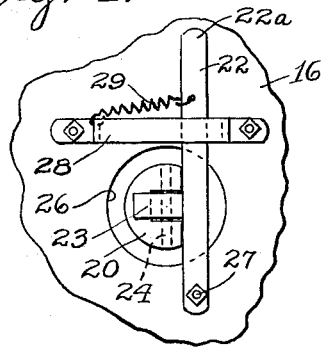
Figure 5:
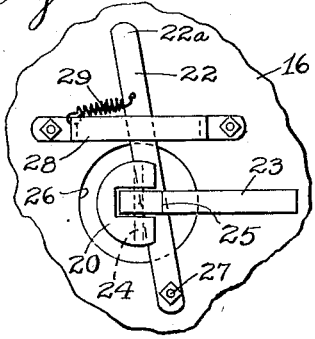

My invention will best be understood by reference to the accompanying drawings showing a preferred embodiment thereof, in which Fig. 1 is a vertical, central, sectional view through a packing form and my improved form bottom construction, in position to receive a facing layer of fruit, Fig. 2 shows in a view similar to Fig. 1, the facing layer of fruit pressed to substantially horizontal position, Fig. 3 shows in a view similar to Fig. 1, the form completely packed, with a basket slipped upon it with one of its wire handles engaging my handle retaining device, Fig. 4 is a bottom view of the form bottom shown in Fig. 1, with a latch illustrated in its position releasing the fruit receiving surface of the form bottom, Fig. 5 shows in a view similar to Fig. 4 the retaining devices of the fruit receiving surface of the form bottom, and the retaining latch for the same, in the position assumed by these parts for the position of the form bottom shown in Fig. 2, Fig. 6 shows in a view similar to Fig. 1, a modified form of supporting mechanism for the fruit receiving surface of the form bottom, and Fig. 7 shows in a view similar to Fig. 6, the devices thereof in the position assumed by them when the fruit receiving surface of the form bottom is in its collapsed position.

Similar numerals refer to similar parts throughout the several views.

As shown in Figs. 1 and 2, a packing form 10 is illustrated as supported in reversed position on blocks 11 and 12 which in turn rest on a low table or platform 13. The form 10 is provided with an inturned flange 14 which supports the edges of the form bottom 15 so that it is disposed in a generally horizontal position across the lower end of the form 10.

The form bottom 15 consists of a lower disk like member 16 preferably of cast or sheet metal, which is dished somewhat so that its upper surface is concave. The fruit receiving surface of the form bottom consists of a sheet of fabric or similar flexible material 17, of the general size and shape of the disk 16, the edge of the sheet 17 being folded around a retaining ring 18, and the ring and the edges of the disk and sheet being secured together by suitable fastening devices, for example rivets as indicated. The central portion of the sheet 17 has secured to its lower surface, by suitable fastening devices, for example rivets as indicated, the flange 19 of a boss member 20, which is provided with a notch or recess 21 to be engaged by a latch bar 22 when the sheet 17 is depressed or collapsed to its position indicated in Fig. 2. The lower end of the boss member 20 is slotted to receive the upper end of a guide member 23 which is pivotally connected to the boss member 20 at 24, said guide member being provided with a shoulder 25 to hold the guide member in vertical position against the action of the latch bar 22 resting against it. The upper end of the guide member 23 projects into the notch 21, as indicated at 23a, for the position of the guide member shown in Fig. 1. The central portion of the disk 16 is provided with an aperture 26 through which the guide member 23 projects, and across which the latch bar 22 extends.

As more clearly shown in Fig. 4, the latch bar 22 is pivotally connected with the disk 16 at 27 and after extending across the aperture 26 it extends under a supporting bracket 28 and continues beyond said bracket enough to constitute a handle portion 22a conveniently accessible to the operator. A spring 29 extends between the latch bar 22 and the supporting bracket 28 and tends to hold the latch bar 22 in engagement with the guide member 23. The relation of the parts described is such that when the sheet 17 is depressed, the latch bar 22 rides against the edge of the guide bar 23 and is caused to enter the notch 21 in the boss member 20, since the edge of the guide bar 23 is substantially in alignment with the surface of the boss member 20. At this time the spring 29 forces the latch bar 22 into the notch 21 and moves the guide member 23 to the position indicated in Fig. 2. The latch bar 22 may be moved from the notch 21 either by pressing the guide member 23 downwardly, or by moving the latch bar 22 to the right, as desired.

A spring 30, preferably of helico-spiral conformation, is located between the flange 19 and the inner surface of the disk 16, which spring is of sufficient stiffness to hold the sheet 17 in its distended position for the service to which the packing device will usually be put. If for any reason it is desired to more positively support the sheet 17 in its distended position, it may be raised slightly by pushing the guide member 23, so that the latch bar 22 will engage the shoulder 23b formed on the lower end portion of the guide member 23, the inclination of the surface of the shoulder 23b being preferably such that combined with the action of the latch spring 29, a considerable effort will be required downwardly upon the central portion of the sheet 17 to move the latch bar 22 from engagement with the shoulder 23b, it being preferable however, that the inclination of the shoulder shall be great enough so that positive locking of the sheet 17 in its distended position will not result from engagement of the latch bar 22 with the shoulder. The helico-spiral formation of the spring 30 permits it to be pressed into a small thickness, so that the sheet 17 may assume substantially the position indicated in Fig. 2 when it is depressed, which position may be a horizontal one or slightly below that position at its central portion.

In using the construction described, with the form 10 and form bottom 15 in the position shown in Fig. 1, the first layer of fruit, for example apples, pears, peaches or other fruit indicated at 31, is placed in the form and will naturally assume its proper position on the sheet 17, due to the conical shape of the sheet at this time, and the fruit will thus require a minimum amount of handling to distribute it in an even layer on the sheet 17. When this layer which is the facing layer of the completed pack, is arranged to completely cover the sheet 17, it is pressed downwardly by the operator, to the position shown in Fig. 2, which may be a generally horizontal position or if preferred, a position such that the central portion of the facing layer is slightly lower than its edge portion to give a slightly rounded effect to the completed pack. As above described, the latch bar 22 holds the sheet 17 in the position indicated in Fig. 2 during the remainder of the packing operation. The rest of the fruit to be packed in the form 10, is then poured into the form through its open bottom and when the form has been completely filled, the basket 32 to be packed, is pressed upon the form 10 so that one of its handles 33 engages one of the notches 34 in a notched bracket 35 rigidly secured to the inner surface of one of the handles 36 of the form 10. With the handle 33 in engagement with the bracket 35, all that is required to reverse the basket 32 and the filled form 10, is to grasp the other handle 37 of the basket and the other handle 38 of the form, which may be done with one hand, and tilt them over on the support 12 in the direction indicated by the arrow 39, so that the form and basket will roll over on the table 13 into upright position. The handle 33 is then disengaged from the bracket 35, pressure is exerted downwardly on the form bottom 15 to hold the packed fruit in place, and the form 10 is drawn upwardly from the basket by means of the handles 36 and 38. This part of the operation is permitted since the packing form 10 is of flexible material for example sheet metal, separated at its upper portion in its packing position, by slots 10a into a plurality of long tongues 10b which yield sufficiently to pass outwardly around the packed fruit without damaging it. The pressure on the form bottom 15 serves to settle the fruit in the basket 32, so that the facing layer 31 is snugly contained in the basket to constitute its top layer of packed fruit.

In Figs. 6 and 7, I illustrate a modified form of mechanism for holding the sheet 17 in its uppermost and lowermost positions as desired. In this construction, the sheet 17 has secured to the inner surface of its central portion by suitable means, for example rivets as indicated, a flange 40 from which a post 41 rigidly secured thereto, extends downwardly through the aperture 26 in the disk 16. The post has formed on its edge adjacent the latch bar 22, two shoulders 42 and 43, to be engaged by the latch bar 22, and each having an inclination sufficient to hold the sheet 17 either in its uppermost or lowermost position as desired, due to the inclination of the shoulder and the action of the spring 29. The inclination of the shoulders 42 and 43 is such however, that in pressing the facing layer of fruit downwardly, the latch bar 22 will be moved from engagement with the shoulder 43, and further that a reasonable amount of pressure against the outer end of the post 41 will move it from the position shown in Fig. 7 to the position shown in Fig. 6. The edge 41a of the post 41, opposite to the edge carrying the shoulders 42 and 43, preferably is in sliding engagement with the adjacent portion of the aperture 26 to prevent the action of the spring 29 displacing the post 41 laterally.

It will be understood that any desired packing form the equivalent of the form 10 above described, may be used with my improved form bottom, and in fact that my construction may be employed to produce a tightly packed facing layer of fruit, in any connection where such devices can be employed, for example where open bottom baskets are used and no forms are employed, the basket bottoms being closed after the baskets have been packed.

By my construction the handling of the fruit is reduced to a minimum, a shorter time is required to arrange the facing layer of the pack, and a firmer pack is secured due to the manner in which the facing layer is effectively pressed together as described, than where the packing is done by other means. The labor of reversing the packed basket or container is also reduced by my handle engaging bracket, since it is necessary to lift but half the weight of the packed form and basket in rolling them over to their reversed or upright position to permit the removal of the packing form.

While I have shown my invention in the particular embodiment above described, it will be understood that I do not limit myself to this exact construction as I may employ equivalents known to the art at the time of the filing of this application without departing from the scope of the appended claims.

What I claim is:

1. A bottom construction for a fruit packing device consisting of side walls and a bottom separate from said side walls, comprising the combination of a disk member of rigid material, a conically shaped member of flexible material of substantially the size of said disk member and secured around its edge to the edge of said disk member, and devices carried by one of said members to engage the other of said members for holding said flexible member above the edge of said disk member in conical form during the placing of the first layer of fruit in said packing device on said flexible member and permitting the depression of said first layer and said flexible member towards said disk member into substantially horizontal position.

2. A bottom construction for a fruit packing device consisting of side walls and a bottom separate from said side walls, comprising the combination of a disk member of rigid material, a conically shaped member of flexible material of substantially the size of said disk member and secured around its edge to the edge of said disk member, devices carried by one of said members to engage the other of said members for holding said flexible member above the edge of said disk member in conical form during the placing of the first layer of fruit in said packing device on said flexible member and permitting the depression of said first layer and said flexible member towards said disk member into substantially horizontal position, and mechanism for holding said flexible member in depressed position.

3. A bottom construction for a fruit packing device consisting of side walls and a bottom separate from said side walls, comprising the combination of a disk member of rigid material, a conically shaped member of flexible material of substantially the size of said disk member and secured around its edge to the edge of said disk member, and devices carried by one of said members to engage the other of said members for holding said flexible member above the edge of said disk member in conical form during the placing of the first layer of fruit in said packing device on said flexible member and permitting the depression of said first layer and said flexible member towards said disk member into substantially horizontal position and for holding said flexible member in depressed position.

4. A bottom construction for a fruit packing device consisting of said walls and a bottom member separate from said side walls, comprising the combination of a disk of rigid material, a conically shaped member of flexible material of substantially the size of said disk and secured around its edge to the edge of said disk, a strut extending downwardly from the central portion of said flexible member freely through said disk, a latch carried by said disk for engaging said strut, and a spring tending to hold said flexible member in its raised position.

5. A bottom construction for a fruit packing device consisting of side walls and a bottom member separate from said side walls, comprising the combination of a disk of rigid material, a conically shaped member of flexible material of substantially the size of said disk and secured around its edge to the edge of said disk, a strut extending downwardly from the central portion of said flexible member freely through said disk, and a latch carried by said disk for engaging said strut.

6. A bottom construction for a fruit packing device consisting of side walls and a bottom separate from said side walls, comprising the combination of a disk member of rigid material, a conically shaped member of flexible material of substantially the size of said disk member and secured around its edge to the edge of said disk member, and devices carried by one of said members to engage the other of said members for holding said flexible member above the edge of said disk member in conical form during the placing of the first layer of fruit in said packing device on said flexible member and permitting the depression of said first layer and said flexible member towards said disk member into substantially horizontal position, said disk member being concave on its upper surface to receive said flexible member in its depressed position.

7. A bottom construction for a fruit packing device consisting of side walls and a bottom member separate from said side walls, comprising the combination of a disk of rigid material, a conically shaped member of flexible material of substantially the size of said disk and secured around its edge to the edge of said disk, a strut extending downwardly from the central portion of said flexible member freely through said disk, a latch carried by said disk for engaging said strut, and a boss member secured to the central portion of said flexible member and pivotally supporting said strut, said boss having a recess therein for engaging said latch.

8. A bottom construction for a fruit packing device consisting of side walls and a bottom member separate from said side walls, comprising the combination of a disk of rigid material, a conically shaped member of flexible material of substantially the size of said disk and secured around its edge to the edge of said disk, a strut extending downwardly from the central portion of said flexible member freely through said disk, a latch carried by said disk for engaging said strut, a boss member secured to the central portion of said flexible member and pivotally supporting said strut, said boss having a recess therein for engaging said latch, and a spring between said disk and said flexible member tending to raise the central portion of said flexible member.

9. A bottom construction for a fruit packing device consisting of side walls and a bottom member separate from said side walls, comprising the combination of a disk of rigid material, a conically shaped member of flexible material of substantially the size of said disk and secured around its edge to the edge of said disk, a strut extending downwardly from the central portion of said flexible member freely through said disk, a latch carried by said disk for engaging said strut, a boss member secured to the central portion of said flexible member and pivotally supporting said strut, said boss having a recess therein for engaging said latch, and a spring between said disk and said flexible member tending to raise the central portion of said flexible member, said spring being of helico-spiral conformation permitting depression of said flexible member closely to said disk.

10. A bottom construction for a fruit packing device consisting of side walls and a bottom member separate from said side walls, comprising the combination of a dished metal disk having a central aperture, a sheet of fabric of substantially the size and shape of said disk, devices securing the edges of said disk and sheet together, a notched boss member secured to the central portion of said sheet to extend through said disk aperture when said sheet is depressed, a guide member pivotally connected with said boss member and extending through said disk aperture, a latch bar pivotally connected with said disk and extending across said disk aperture for engagement with said guide member, and a spring tending to separate said sheet from said disk.

11. A bottom construction for a fruit packing device consisting of side walls and a bottom member separate from said side walls, comprising the combination of a dished metal disk having a central aperture, a sheet of fabric of substantially the size and shape of said disk, devices securing the edges of said disk and sheet together, a notched boss member secured to the central portion of said sheet to extend through said disk aperture when said sheet is depressed, a guide member pivotally connected with said boss member and extending through said disk aperture, a latch bar pivotally connected with said disk and extending across said disk aperture for engagement with said guide member, a spring tending to separate said sheet from said disk and a second spring holding said latch bar against said guide member.

12. A bottom construction for a fruit packing device consisting of side walls and a bottom member separate from said side walls, comprising the combination of a dished metal disk having a central aperture, a sheet of fabric of substantially the size and shape of said disk, devices securing the edges of said disk and sheet together, a notched boss member secured to the central portion of said sheet to extend through said disk aperture when said sheet is depressed, a guide member pivotally connected with said boss member and extending through said disk aperture, a latch bar pivotally connected with said disk and extending across said disk aperture for engagement with said guide member, a spring tending to separate said sheet from said disk, and a second spring holding said latch bar against said guide member, said guide member having a shoulder engaging said boss member to hold it in position to guide said latch bar into the notch in said boss.

13. A bottom construction for a fruit packing device consisting of side walls and a bottom member separate from said side walls, comprising the combination of a dished metal disk having a central aperture, a sheet of fabric of substantially the size and shape of said disk, devices securing the edges of said disk and sheet together, a notched boss member secured to the central portion of said sheet to extend through said disk aperture when said sheet is depressed, a guide member pivotally connected with said boss member and extending through said disk aperture, a latch bar pivotally connected with said disk and extending across said disk aperture for engagement with said guide member, a spring tending to separate said sheet from said disk, and a second spring holding said latch bar against said guide member, said guide member having a shoulder engaging said boss member to hold it in position to guide said latch bar into the notch in said boss and extending into said notch in its guiding position to move said latch bar from said notch by turning it on its pivot.

14. A bottom construction for a fruit packing device consisting of side walls and a bottom member separate from said side walls, comprising the combination of a dished metal disk having a central aperture, a sheet of fabric of substantially the size and shape of said disk, devices securing the edges of said disk and sheet together, a notched boss member secured to the central portion of said sheet to extend through said disk aperture when said sheet is depressed, a guide member pivotally connected with said boss member and extending through said disk aperture, a latch bar pivotally connected with said disk and extending across said disk aperture for engagement with said guide member, and a spring tending to separate said sheet from said disk, said spring being of helico-spiral conformation.

15. A device for packing a facing layer of fruit in a container, comprising a rigid disk member of metal, a sheet member of flexible material secured to the edge of said disk member, and devices carried by one of said members to engage the other of said members for holding said sheet member distended from said disk member to arrange said facing layer of fruit and permitting collapse of said sheet member against said disk member to pack said layer.

16. A device for packing a facing layer of fruit in a container, comprising a rigid disk of metal, a sheet of flexible material secured to the edge of said disk, a strut carried by said sheet and extending through said disk, and a latch carried by said disk engaging said strut.

17. A device for packing a facing layer of fruit in a container, comprising a rigid disk of metal, a sheet of flexible material secured to the edge of said disk, a strut extending from said sheet through said disk, a latch carried by said disk engaging said strut, and a spring tending to move said sheet to its distended position away from said disk.

In witness whereof, I hereunto subscribed my name this 29 day of September, A. D. 1928.

AARON W. HERRIMAN.